US010625228B2

(12) United States Patent
Liu et al.

(10) Patent No.: US 10,625,228 B2
(45) Date of Patent: Apr. 21, 2020

(54) FLUIDIZED BED DEVICE AND METHOD FOR COATING PARTICLES OR GRANULATION

(71) Applicant: TIANJIN CENAX BIOTECHNOLOGY CO., LTD., Tianjin (CN)

(72) Inventors: Yiming Liu, Tianjin (CN); Huifen Lu, Shijiazhuang (CN); Fei Liu, Tianjin (CN); Yitao Liu, Suzhou (CN); Min Chen, Tianjin (CN)

(73) Assignee: Tianjin Cenax Biotechnology Co., Ltd., Tianjin (CN)

( * ) Notice: Subject to any disclaimer, the term of this patent is extended or adjusted under 35 U.S.C. 154(b) by 0 days.

(21) Appl. No.: 16/075,002

(22) PCT Filed: Feb. 2, 2016

(86) PCT No.: PCT/CN2016/073224
§ 371 (c)(1),
(2) Date: Aug. 2, 2018

(87) PCT Pub. No.: WO2017/132843
PCT Pub. Date: Aug. 10, 2017

(65) Prior Publication Data
US 2019/0374917 A1    Dec. 12, 2019

(51) Int. Cl.
*B01J 2/16* (2006.01)
*B05D 1/02* (2006.01)
(Continued)

(52) U.S. Cl.
CPC .............. *B01J 2/006* (2013.01); *B01J 2/16* (2013.01); *B01F 13/0261* (2013.01); *B01J 8/24* (2013.01);
(Continued)

(58) Field of Classification Search
CPC ........ B05D 1/18; B05D 3/0272; B05D 3/104; B05D 5/08; C03C 17/25; C03C 17/253;
(Continued)

(56) References Cited

U.S. PATENT DOCUMENTS

| 3,253,944 A | 5/1966 | Wurster |
| 4,394,350 A | 7/1983 | Cheng |

(Continued)

FOREIGN PATENT DOCUMENTS

| CN | 203609667 U | 5/2014 |
| JP | H09-501610 A | 2/1997 |

(Continued)

OTHER PUBLICATIONS

PCT International Search Report and Written Opinion, PCT Application No. PCT/CN2016/073224, dated Nov. 7, 2019. 14 pages (with English translation of the International Search Report).

(Continued)

*Primary Examiner* — Alexander M Weddle
(74) *Attorney, Agent, or Firm* — Fenwick & West LLP (57) ABSTRACT

The present invention relates to a fluidized bed apparatus and a method for particle-coating or granulating, the fluidized bed apparatus includes a swirl generator which is mounted on a sprayer body in the fluidized bed apparatus and extends throughout an air distribution plate and is connected to a source of compressed air. The swirl generator comprises a tubular sleeve extending circumferentially around the sprayer body, and an air chamber is defined between the sleeve and the sprayer body, wherein the sleeve comprises a plurality of guiding slots. The air from the source of compressed air via the air chamber is directed by said guiding slots to rotate outwardly, so as to provide a swirling air stream circumferentially outwardly relative to the sprayer. The present invention can facilitate the devel- (Continued)

opment of the spray pattern and the particle flow pattern and allows the particles to spin respectively due to slight friction with the inner wall of the partition, thereby opportunities for the particles to obtain a more uniform spray when subsequently passing through the spray zone above the nozzle are increased, so that performance of the fluidized bed apparatus is improved.

30 Claims, 7 Drawing Sheets

(51) Int. Cl.
*B01J 2/00* (2006.01)
*B01F 13/02* (2006.01)
*B01J 8/24* (2006.01)
*B05B 1/34* (2006.01)
*F26B 3/092* (2006.01)

(52) U.S. Cl.
CPC ............... *B05B 1/34* (2013.01); *F26B 3/0926* (2013.01); *F26B 2200/08* (2013.01)

(58) Field of Classification Search
CPC ............. C03C 17/256; C03C 2217/24; C03C 2218/111; C03C 23/0075; G02B 1/18
USPC .......................................................... 427/212
See application file for complete search history.

(56) References Cited

U.S. PATENT DOCUMENTS

| | | | |
|---|---|---|---|
| 6,773,747 B2* | 8/2004 | Jensen | B01F 13/0261 427/212 |
| 2004/0131791 A1* | 7/2004 | Torben-Walter | B05B 13/025 427/425 |
| 2006/0130748 A1* | 6/2006 | Bender | B01J 2/16 118/62 |
| 2008/0000419 A1 | 1/2008 | Bender et al. | |
| 2011/0315079 A1* | 12/2011 | Perpar | B01J 2/16 118/716 |

FOREIGN PATENT DOCUMENTS

| | | |
|---|---|---|
| JP | H11-33386 A | 2/1999 |
| JP | 2004-097852 A | 4/2004 |
| JP | 2004-130194 A | 4/2004 |
| WO | WO 2010/107401 A2 | 9/2010 |

OTHER PUBLICATIONS

The Patent Office of the People's Republic of China, Notification of Second Office Action, CN Patent Application No. 201680001647.3, dated Oct. 12, 2018, six pages.
European Patent Office, Extended European Search Report and Opinion, EP Patent Application No. 16888668.7, dated Aug. 1, 2019, five pages.
Japan Patent Office, Notice of Reasons for Refusal, JP Patent Application No. 2018-539939, dated Mar. 18, 2019, 19 pages.

* cited by examiner

FLUIDIZED BED DEVICE AND METHOD FOR COATING PARTICLES OR GRANULATION

CROSS REFERENCE TO RELATED APPLICATIONS

This application is a 35 U.S.C. § 371 national stage filing of International Application No. PCT/CN2016/073224, filed on Feb. 2, 2016, the disclosure of which is incorporated herein by reference.

FIELD OF THE INVENTION

The present invention relates to a swirl generator of a fluidized bed apparatus for particle-coating or granulating, a fluidized bed apparatus comprising the swirl generator and a method for coating particles or granulating used in the fluidized bed apparatus. The present invention further relates to dual partitions, instead of a single partition, used in a fluidized bed apparatus for particle-coating or granulating. In addition, the present invention relates to a fluidized bed apparatus comprising the dual partitions combining with a swirl generator and a method of particle-coating or granulating used in the fluidized bed apparatus.

BACKGROUND OF THE INVENTION

Various specialized equipment and apparatuses have been known to be provided for purposes of coating or granulating, which generally comprise a cylindrical partition disposed vertically in a container and a sprayer disposed concentric with the partition, the partition is suspended above a perforated air distribution plate lined with a metal mesh thereon, wherein the partition separates the container into a central upward flow bed area and a surrounding downward flow bed area. The air distribution plate is perforated with openings in a larger dimension in the central area inside the vertical projection area of the partition and with openings in a smaller dimension in the surrounding area outside the vertical projection area of the partition. An annular slit exists vertically between the partition and the air distribution plate and function as an annular passage for the particles flowing from the downward flow bed area to the upward flow bed area.

Due to the high velocity of a stronger upward air stream passing through the central area of the air distribution plate, a minimal static pressure is inwards created in the annular slit beneath the wall of the partition and in the annular border zone over the air distribution plate beneath the wall of the partition, meanwhile the particles are kept in a suspended semi-fluidized status by means of a weaker upward air stream passing through the surrounding area of the air distribution plate, wherein the weaker upward air stream creates a fluidized layer over the surrounding area of the air distribution plate and is fitly able to prevent adhesions of the particles to be treated in the fluidized layer and to keep those particles slightly in movement. Therefore, the particles to be treated presenting in the fluidized layer outside the partition will travel towards inside of the partition through the annular slit beneath the wall of the partition due to the minimal static pressure created by the stronger upward air stream.

The stronger upward air stream in high velocity passing through the air distribution plate carries the particles to travel upwardly in the partition, where the particles are coated or granulated with spray discharged from a nozzle of a sprayer. Then the particles encounter the weaker upward air stream in low velocity in the expansion area above the partition. When the velocity of the air stream is insufficient to support the particles, the particles fall under gravity into the downward flow bed area and reenter into the high velocity air stream in the partition under the suction effect presented in the annular slit and encounter the stronger upward air stream. In such a way, a circulation of coating or granulating in the upward flow bed area and drying in the downward flow bed area is accomplished. According to the prior arts, the stronger upward air stream is necessary to be optimized to improve the process and quality of the product.

In an improved modification of such an apparatus (see U.S. Pat. No. 6,773,747 B2) includes an air stream diverter for blowing the particles away from the nozzle during the spraying process, the air stream diverter comprises a sleeve extending around the sprayer and having a plurality of holes near the nozzle. The sleeve is operatively connected to a source of compressed air, which forces air to discharge radially outwards along the circumference through the holes in the sleeve. Once a diverting air stream encounters a stronger upward air stream passing through an air distribution plate, a diverting upward air stream directing radially outwards is generated, which allows more sufficient development of the spray pattern so as to increase the effective area of the spray zone, such that the diverting upward air stream pushes the particles away from the nozzle and prevents the particles from collapsing into the nozzle before passing through the spray zone, thereby the process allows higher spray rate while reducing over-wetting, uneven-wetting and agglomeration of the particles. However, due to the high radial velocity vector of the diverting air stream in the process, the particles may collide with the inner wall of the partition, which can cause a risk of damage to the coating film or granules.

A series of embodiments of this prior art apparatus (see U.S. Pat. Nos. 5,718,764 and 6,492,024 B1) comprise an air vortex generator for improving and facilitating the process, a cylindrical partition positioned vertically over a nozzle and concentrically with the nozzle, wherein the nozzle is mounted in a circular hole in an air distribution plate at the same level as said air distribution plate, whereby an annular slot is formed around the nozzle, wherein the air vortex generator is positioned beneath the air distribution plate and located inside a plenum base and comprises an air guiding wall positioned below the air distribution plate and fitted to the edge of the annular slot, wherein the air guiding wall defines a rotational symmetric space having downward expanding horizontal cross-section area and may typically be shaped as a downward expanding cone. Deflecting elements are constructed rotationally symmetrically at the lower part of the air guiding wall and each deflecting element may typically have a vertical section and a slanted section deflecting the air stream in the same direction, such that an air vortex is generated and passes through the annular slots around the nozzle, then the air vortex carries particles along a spiral upward path through the spray zone and the upward flow bed area in the partition. It has demonstrated that such controlled air vortex contributes to increased occurrence of contact of the particles with the discharged droplets due to the spiral upward movement while passing through the spray zone. However, due to the high velocity vector in the axial direction the air vortex impedes the sufficient development of the spray pattern and the particle flow pattern before entering of the particles into the spray zone, which can cause a risk of over-wetting, uneven-wetting or agglomeration.

Another improved modification of such an apparatus (see US2011/0315079 A1) includes another art of air vortex generator, which is relative to the conventional apparatus suitable for smaller particles and can obtain a more uniform particle-coating and minimize adhesions of particles in the process, wherein the air vortex generator shaped as a circular plate has a plurality of configuration slots which are open outwards and at an angle with regard to the vertical direction, the air vortex generator is mounted in the center of an air distribution plate beneath a cylindrical partition and is coaxial with a sprayer. As a result of the inclination of the grooves, upward raising air is diverted into a vortex, wherein the air vortex brings the particles into a spray zone in the partition to achieve coating. The air vortex improves the heat transfer in a two-phase flow as a result of a longer path at a distance in the axial flow direction. Due to the better heat transfer, it can be expected to obtain a more uniform particle-coating, reduced adhesions of particles and overcome the problem with coating smaller particles. However, in one aspect, since the tangential velocity and axial velocity of the air vortex are not controllable separately, the ratio of the tangential velocity and axial velocity is unchangeable, so that the air vortex is not able to meet concrete requirements of the specific process varying in terms of batch size, particle size and process property, etc., which means the air vortex can't be optimized to suit a specific process. In another aspect, the air vortex generated by the air vortex generator shaped as a circular plate is characterized with being stronger in the central area near the sprayer and being weaker in the surrounding area away from the sprayer, such that the air vortex impedes the development of the spray pattern and therefore interfere with the sufficient atomization of the droplets, which can cause a risk of over-wetting and uneven-wetting. In a further aspect, due to the immediate expansion of the air vortex after passing through the generator and the sudden acceleration of the particles on the generator, the air vortex impedes the development of the particle flow pattern and therefore interfere with the motion of the particles, which means the particles are subjected to an undesired irregular movement in the process.

It is obvious that the aerodynamic means contributing to the development of the spray pattern and the particle flow pattern can advantageously improve the process and the quality of the product. On the one hand, such improved aerodynamic means allows sufficient development of the spray pattern and the particle flow pattern. On the other hand, the optimized convection path of the product causes the particles to be uniformly sprayed, which ensures a maximum efficiency of spraying and a very stable operation while increasing the spray rate and produces high quality product with premium physical attributes. The type of aerodynamically atomized nozzles is commonly used, for example using a high-speed jet of air to disperse a liquid jet into small droplets in form of a cone-shaped cloud or spray pattern, preferably dual-fluids nozzle is utilized.

SUMMARY OF THE INVENTION

Accordingly, one conception of the present invention is an aerodynamic means of introducing a rotational rising air stream near the sprayer in the upward flow bed area in the partition to facilitate the development of the spray pattern and the particle flow pattern. Meanwhile the particles are subjected into a rotational rising path and are allowed to spin separately due to slight friction between the particles and the inner wall of the partition, thereby opportunities for the particles to obtain a more uniform spraying when subsequently passing through the spray zone above the nozzle are increased, so that the particles in the fluidized bed apparatus are ensured to be prevented from entering into the spray zone and contacting with the droplets here until the density of the droplets decreases due to the sufficient development of the spray pattern, wherein the attrition of the particles is minimized due to the spiral upward motion of the particles along the inner wall of the partition. Apart from the air vortex formed on the basis of generating in the vertical direction/guiding in the horizontal direction in the prior art, the swirling air stream is formed by generating in the horizontal direction/guiding in the vertical direction according to the conception of the present invention, such that the swirling air stream accelerates the particles continuously and steadily in the tangential direction in the preset vertical section of the partition, which contributes to the development of the spray pattern and the particle flow pattern, and optimizes the convection path of the product. Furthermore, a conventional fluidized bed apparatus can be simply retrofitted with the swirl generator according to the present invention as an accessory so as to improve its performance.

Another conception of the present invention is an aerodynamic means of utilizing dual partitions instead of single-partition and introducing a descending air stream in the descending flow bed area between the dual partitions, which allows the sprayed particles to be differentiated according to the particle sizes and distinctively treats the particles of different particle sizes respectively, thereby to prevent the small particles from mutual adhesions due to their high surface energy in the process of coating or granulating, wherein the small particles are selectively treated continuously and circularly to increase the particle size rapidly till all the particles present in a uniform particle size. Meanwhile the adverse effect of non-uniform spraying due to the mutual obscuring effect among the particles is eliminated or minimized. In such way, the adaptability of the fluidized bed apparatus according to the present invention is improved in the adaption capability to the process requirements of the particles with the high surface energy, and the application field of the process of coating or granulating is expanded.

To accomplish the above-mentioned objects, the present invention provides a swirl generator of a fluidized bed apparatus for particle-coating or granulating, the fluidized bed apparatus comprises a product container, a lower plenum base, an air distribution plate residing between the product container and the plenum base, and partition(s), said fluidized bed apparatus further comprises at least one sprayer which includes a sprayer body and a nozzle provided at its upper end, the lower end of said sprayer extending throughout the air distribution plate. The partition is vertically positioned coaxially with the sprayer in the product container and is suspended above the air distribution plate, the swirl generator is mounted on the sprayer body. According to the present invention, the swirl generator extends throughout the air distribution plate and is connected to a source of compressed air, and the swirl generator comprises a tubular sleeve extending circumferentially around the sprayer body, an air chamber is defined between the sleeve and the sprayer body, and the sleeve comprises a plurality of guiding slots, the air from the source of compressed air via the air chamber is directed by the guiding slots to rotate outwardly, so as to provide a swirling air stream circumferentially outwardly relative to the sprayer.

In a preferred embodiment according to the present invention, the guiding slots extend outwardly as radial tangents in the wall of the sleeve.

In a preferred embodiment according to the present invention, the guiding slots extend outwardly as radial asymptotic tangents in the wall of the sleeve.

In a preferred embodiment according to the present invention, the guiding slots extend outwardly and upwardly as radial tangents in the wall of the sleeve, through which the air stream is directed to rotate outwardly and upwardly.

In a preferred embodiment according to the present invention, the guiding slots are directed at an elevation angle between 5° to 80° relative to the horizontal plane.

In a preferred embodiment according to the present invention, the guiding slots are directed at an elevation angle between 15° to 60° relative to the horizontal plane.

In a preferred embodiment according to the present invention, a swirling air stream is provided in a preset vertical section in the partition so as to prevent the air stream and the particles outside the partition from being interfered.

In a preferred embodiment according to the present invention, the sleeve includes an upper end and a lower end, the guiding slots extend axially between the upper end and the lower end.

In a preferred embodiment according to the present invention, the lower end of the sleeve is attached with a manifold, to which an air pipeline extending from the source of compressed air is connected, and the lower end of the sleeve further includes a collar, the air distribution plate is sandwiched between the manifold and the collar.

In a preferred embodiment according to the present invention, an enlarged aperture extends axially throughout the manifold and the collar, the enlarged aperture is adapted to be mounted with a fitting connected to the air pipeline, which is subsequently connected to the source of compressed air.

In a preferred embodiment according to the present invention, a cylindrical metal mesh is covered between the upper end and the lower end of the sleeve, so as to prevent the particles from entering via the guiding slots when operation of the fluidized bed apparatus is interrupted.

In a preferred embodiment according to the present invention, the sleeve and/or the manifold of the swirl generator can be in various forms.

In a preferred embodiment according to the present invention, the partition is cylindrical or approximate cylindrical.

Another aspect according to the present invention provides a fluidized bed apparatus for particle-coating or granulating comprising:

a product container comprising an expansion chamber for containing the particles;

a plenum base disposed beneath the product container and including an inlet duct extending from a primary air source;

an air distribution plate positioned at the bottom of the expansion chamber and including a plurality of air passage openings, through which an air stream from the plenum base enters into the product container;

at least one sprayer positioned vertically above the air distribution plate for upwards discharging a spray of solution into the expansion chamber for particle-coating or granulating;

at least one partition positioned coaxially with the sprayer in the product container vertically and suspended above the air distribution plate;

wherein the openings of the air distribution plate inside the vertical projection area of the partition are larger in diameter than the openings outside the vertical projection area of the partition, so that a stronger upward air stream in larger air volume and higher velocity is generated in the area of the larger openings and a weaker upward air stream in smaller air volume and lower velocity is generated in the area of the smaller openings, thereby for the particles an upward flow bed area and a downward flow bed area separated by the partition are aerodynamically formed in the expansion chamber; and wherein the sprayer is combined with the above-mentioned swirl generator, and a swirling air stream circumferentially outwardly relative to the sprayer is generated by the swirl generator through the air chamber and the plurality of guiding slots, wherein a rotational rising air stream is generated in the partition under combined effect of the swirling air stream and the stronger upward air stream provided through the openings in larger dimension, such that the particles travel in a circulation path that rotationally rises in the upward flow bed area and falls downwardly in the downward flow bed area.

In a preferred embodiment according to the present invention, the partition comprises an open upper end and an open lower end, said upper end extends upwardly into an expansion area aerodynamically defined between the upward flow bed area and the downward flow bed area, said lower end is suspended above the air distribution plate and forms an annular slit with the air distribution plate.

In a preferred embodiment according to the present invention, the rotational rising air stream is generated in a preset vertical section of the partition.

In a preferred embodiment according to the present invention, at least one secondary partition is further equipped, which is larger than the partition in diameter and is positioned coaxially with the partition so as to form an approximate annular air passage between the partition and the secondary partition.

In a preferred embodiment according to the present invention, the air distribution plate in the annular vertical projection area between the partition and the secondary partition is not provided with openings.

In a preferred embodiment according to the present invention, the secondary partition comprises an open upper end and an open lower end.

In a preferred embodiment according to the present invention, the upper end of the secondary partition and the upper end of the partition locate at the same horizontal level and form an annular gap together.

In a preferred embodiment according to the present invention, the lower end of the secondary partition and the lower end of the partition form another annular gap together, while the lower end of the secondary partition and the air distribution plate form a secondary annular slit.

In a preferred embodiment according to the present invention, a descending flow bed area is formed between the partition and the secondary partition, wherein the particles in smaller particle size travel in a circulation path that rotationally rises in the upward flow bed area and falls downwardly in the descending flow bed area due to less momentum of the particles.

In a preferred embodiment according to the present invention, the secondary partition is cylindrical or approximate cylindrical.

A further aspect according to the present invention provides a method used in the above-mentioned fluidized bed apparatus for particle-coating or granulating, the method comprising:

for the particles, directing the stronger upward air stream to aerodynamically form an upward flow bed area and a downward flow bed area separated by the partition in the product container of the fluidized bed apparatus, wherein the stronger upward air stream carries the particles upwardly 
through the upward flow bed area, where the particles are coated or granulated by at least one sprayer for discharging a spray of solution into the expansion chamber; and aerodynamically directing a swirling air stream to cause the particles to rotate circumferentially outwardly relative to the sprayer;

wherein a rotational rising air stream is generated in the partition under combined effect of the stronger upward air stream and the swirling air stream, such that the particles travel in a circulation path that rotationally rises in the upward flow bed area and falls downwardly in the downward flow bed area and/or the descending flow bed area.

In a preferred embodiment according to the present invention, the particles are directed to rotate outwardly away from the sprayer before entering into the spray zone.

In a preferred embodiment according to the present invention, a rotational rising air stream is generated in a preset vertical section of the partition, so as to cause the particles in the preset vertical section to accelerate in a rotational and rising direction.

In a preferred embodiment according to the present invention, the stronger upward air stream and the swirling air stream are controlled separately, so as to change the axial velocity and the tangential velocity of the rotational rising air stream respectively, thus to optimize the operation characteristics of the rotational rising air stream in two dimensions.

In a preferred embodiment according to the present invention, the particles are subjected to spinning movement due to slight friction with the inner wall of the partition, so as to be conducive to uniform coating of the particles.

By means of the swirl generator according to the present invention, the swirl generator allows a more sufficient development of the spray pattern and a more sufficient atomization of the discharged solution and enables the rotational rising air stream to allow a more sufficient development of the particle flow pattern and to bring the particles to travel in a rotational rising path in the upward flow bed area. In such a way, on the one hand, the particles are ensured to obtain uniform spraying when passing through the spray zone, on the other hand, the particles are prevented from being damaged by colliding with the inner wall of the partition in high velocity. Moreover, the swirl generator according to the present invention can eliminate or minimize the adhesions of the wetted particles.

By means of the fluidized bed apparatus according to the present invention, the swirl generator used therein enables the rotational rising air stream to carry the particles into a rotational rising path in the upward flow bed area, thus the particles form a particle flow pattern presenting vertically spirally rising motion in the partition, which results in higher particle density near the inner wall of the partition and a relative lower particle density in the core region of the partition. Simultaneously, the discharged droplets concentrically fly towards adjacency of the spiral particle flow with less or no interference from the particles.

In such a way, the concentrically encountering opportunities between the particles and droplets are increased near the inner wall of the spiral particle flow, and the effect of wall-sticking in the process of the prior art is eliminated or minimized, since the droplets can be prevented from reaching the inner wall of the partition.

In the fluidized bed apparatus according to the present invention, the air volume and the air pressure flowing through the swirl generator can be monitored or controlled, in order to improve performance of the fluidized bed apparatus in the whole process, in which the particle size of the product increases. Moreover, by means of the fluidized bed apparatus according to the present invention, due to expansion of the compressed air discharged from the air guiding slots of the swirl generator, a relative lower temperature is presented in the upward flow bed area, wherein the relative lower temperature minimizes the evaporation from the discharged droplets and the wetted particles so as to contribute to the formation of the coating film or granules. In addition, the utilization of the spray is increased due to elimination or reduction of the spray-drying effect in the process. Moreover, by means of the fluidized bed apparatus according to the present invention, the flow characteristic of the particle flow pattern and the spray pattern in the spray zone can be optimized and therefore a higher spray rate is available.

These and other objects will become apparent from the following description of the invention.

Definition of the Terms in Usage

In the scope of the present specification and the attached contexts, the term "air" is used in its broadest aspect, which also includes atmospheric air and artificial gas.

In the scope of the present specification and the attached contexts, the term "particle" is used in its broadest aspect, which also includes particulate materials to be coated and fine powder to be granulated.

In the scope of the present specification and the attached contexts, the term "product" is used in its broadest aspect, which also includes semi-product in producing process and finished product.

BRIEF DESCRIPTION OF THE DRAWING

FIG. 1 is an axial sectional side view of the fluidized bed apparatus according to the first embodiment of the present invention;

FIG. 2 is a perspective view of the swirl generator according to the first embodiment of the present invention, wherein the cylindrical metal mesh of the swirl generator is unfolded;

FIG. 3 is an axial sectional side view of the sprayer with the swirl generator mounted thereon according to the first embodiment of the present invention;

FIG. 4 is a radial sectional top view of the sleeve along with the sprayer according to the first embodiment of the present invention;

FIG. 5 is an axial sectional side view of the fluidized bed apparatus according to the first embodiment of the present invention, wherein the convection path of the product is illustrated;

FIG. 6 is a sectional schematic view of the first embodiment according to the present invention, wherein the fluidized bed apparatus comprises a plurality of nozzles and partitions;

FIG. 7 is a horizontal sectional view of the fluidized bed apparatus of the first embodiment shown in FIG. 6; and FIG. 8 is an axial sectional side view of the fluidized bed apparatus according to the second embodiment, wherein the convection path of the product is illustrated.

DETAILED DESCRIPTION OF THE INVENTION

With reference to FIG. 1, the fluidized bed apparatus 10 comprises a product container 20 which includes an expansion chamber 21 for containing the particles, a lower plenum base 30 disposed beneath the product container 20, and an air distribution plate 40 located between the product container 20 and the plenum base 30. The upper end 22 of the product container 20 may be opened so as to be connected to an air filter housing (not shown) disposed hereabove, which comprises the air filter structure and air outlet. An inlet duct 31 extends from a primary air source (not shown) into the plenum base 30.

The air distribution plate 40 comprises a plurality of air passage openings 41 and 42, through which air stream from the lower plenum base 30 may enter into the product container 20. A usually cylindrical-shaped partition 50 suspends in the center of the container 20 and separates the container 20 into a central upward flow bed area 23 and a surrounding downward flow bed area 24. The partition 50 includes an open upper end 51 and an open lower end 52, wherein the upper end 51 extends upwardly into an expansion area 25 aerodynamically defined between the upward flow bed area 23 and the downward flow bed area 24, while the lower end 52 suspends above the air distribution plate 40 and form an annular slit 53 with the air distribution plate 40. The openings 41 of the air distribution plate 40 inside the vertical projection area of the partition 50 are larger in diameter than the openings 42 outside the vertical projection area of the partition 50, which results in a stronger upward air stream in higher air volumes and velocities in the area with openings 41 and a weaker upward air stream in lower air volumes and velocities in the area with openings 42, Thereby for the particles a central upward flow bed area 23 and a surrounding downward flow bed area 24 separated by the partition 50 are aerodynamically formed in the product container 20. A sprayer 60 is disposed vertically in line with the central axis of the partition 50 and extends through the air distribution plate 40 into the upward flow bed area 23 of the container 20. A nozzle 61 is provided at the top of the sprayer 60, the nozzle 61 receives compressed air provided from an air supply source (not shown) and sprays solution under pressure provided from a liquid supply source (not shown).

The above description on the structure of the fluidized bed apparatus is conventional, as known in the art.

First Embodiment

Figure 1:
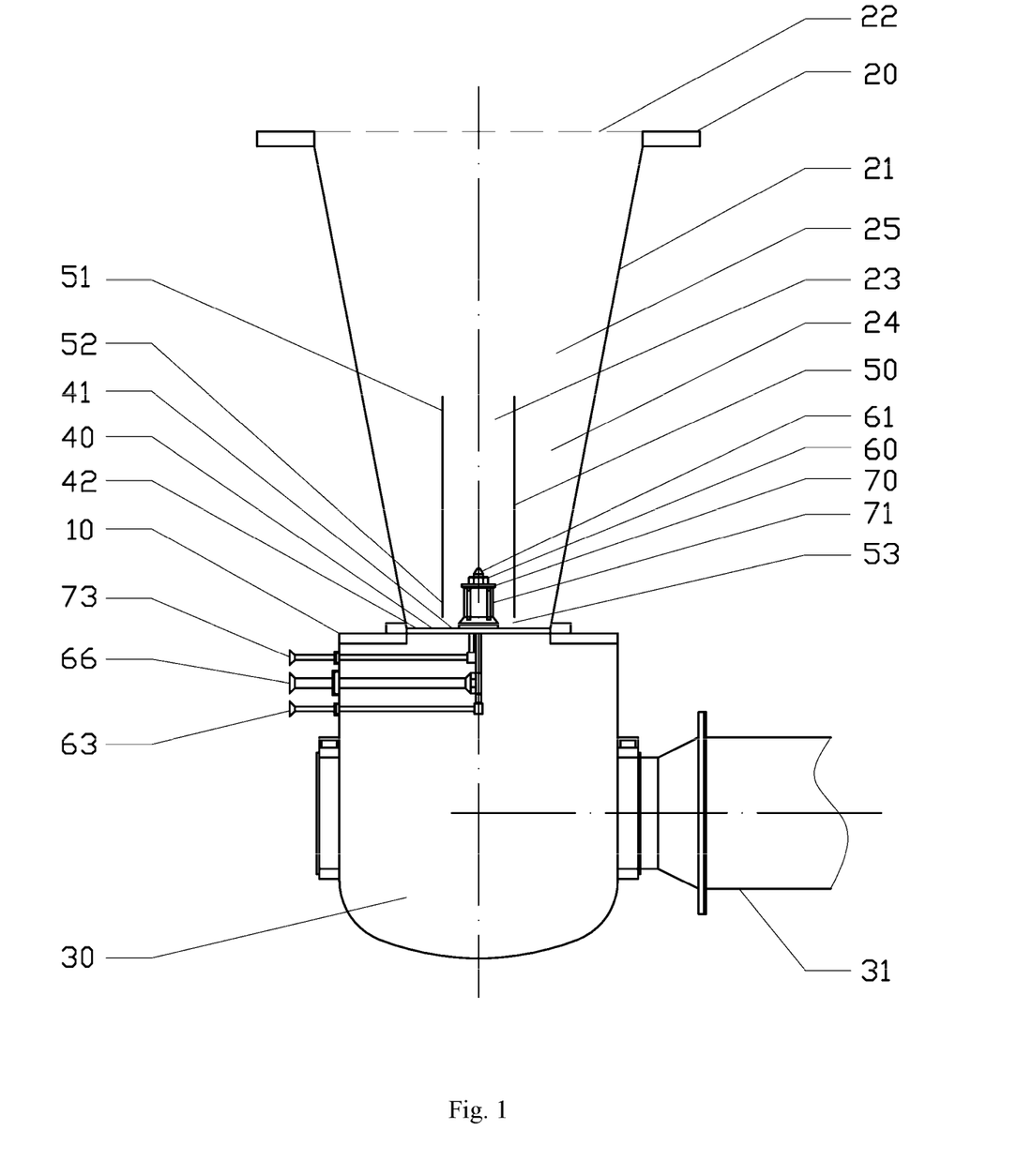
Figure 2:
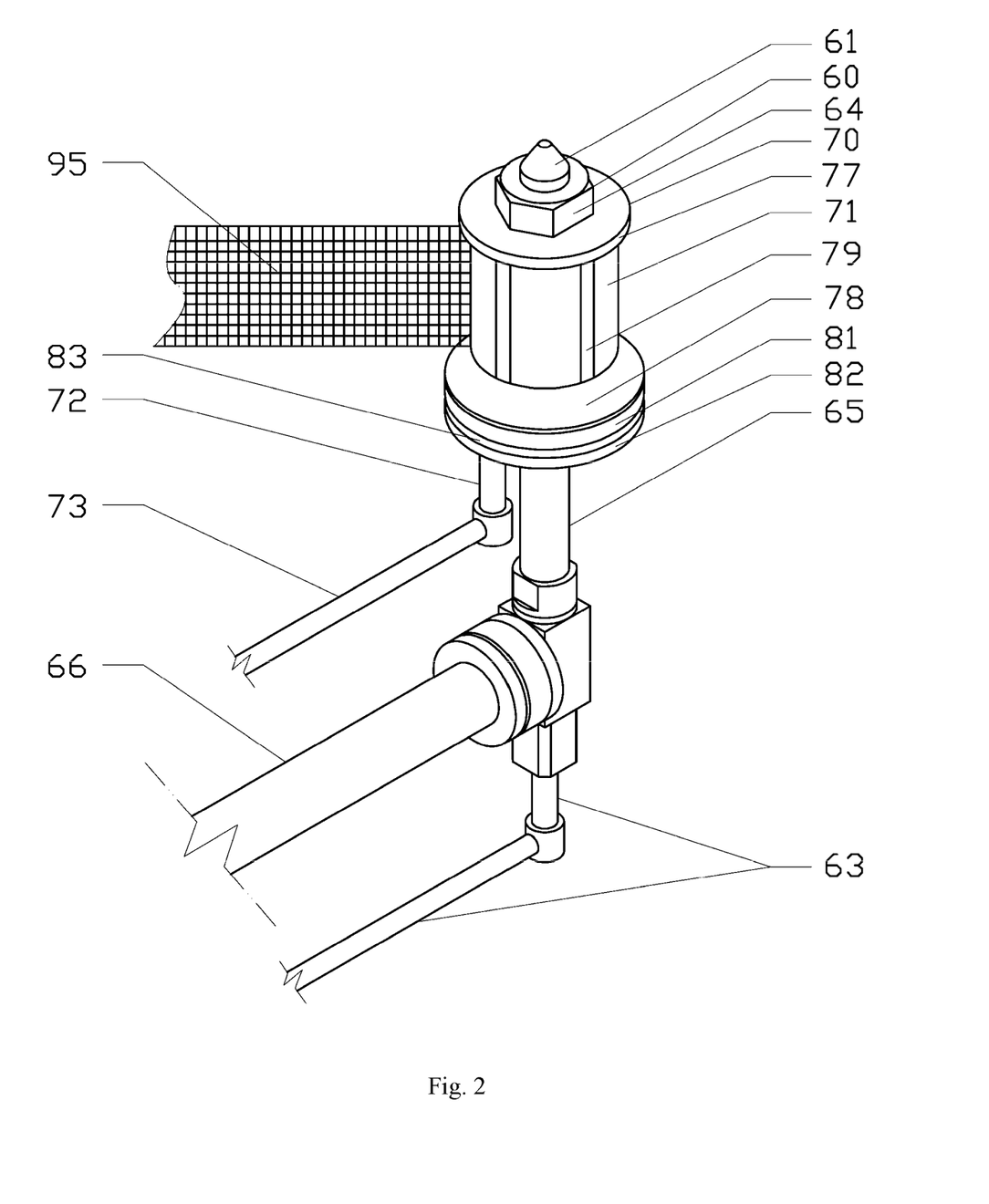
Figure 3:
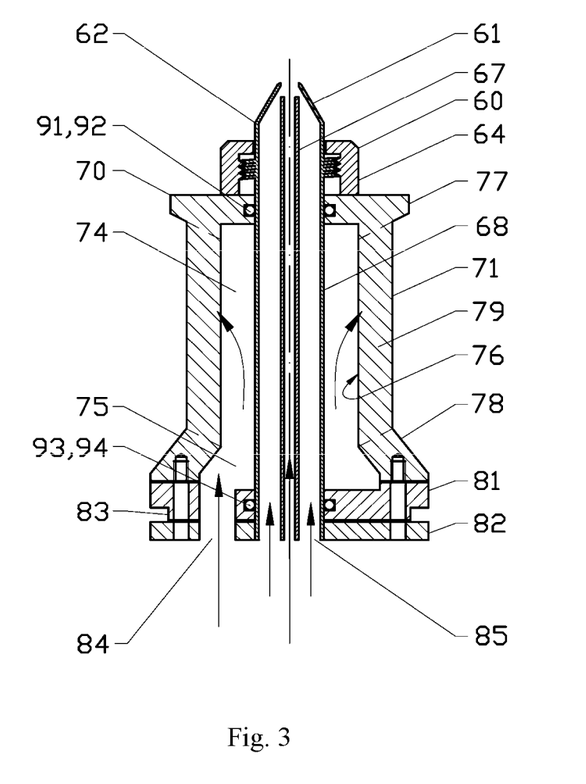
Figure 5:
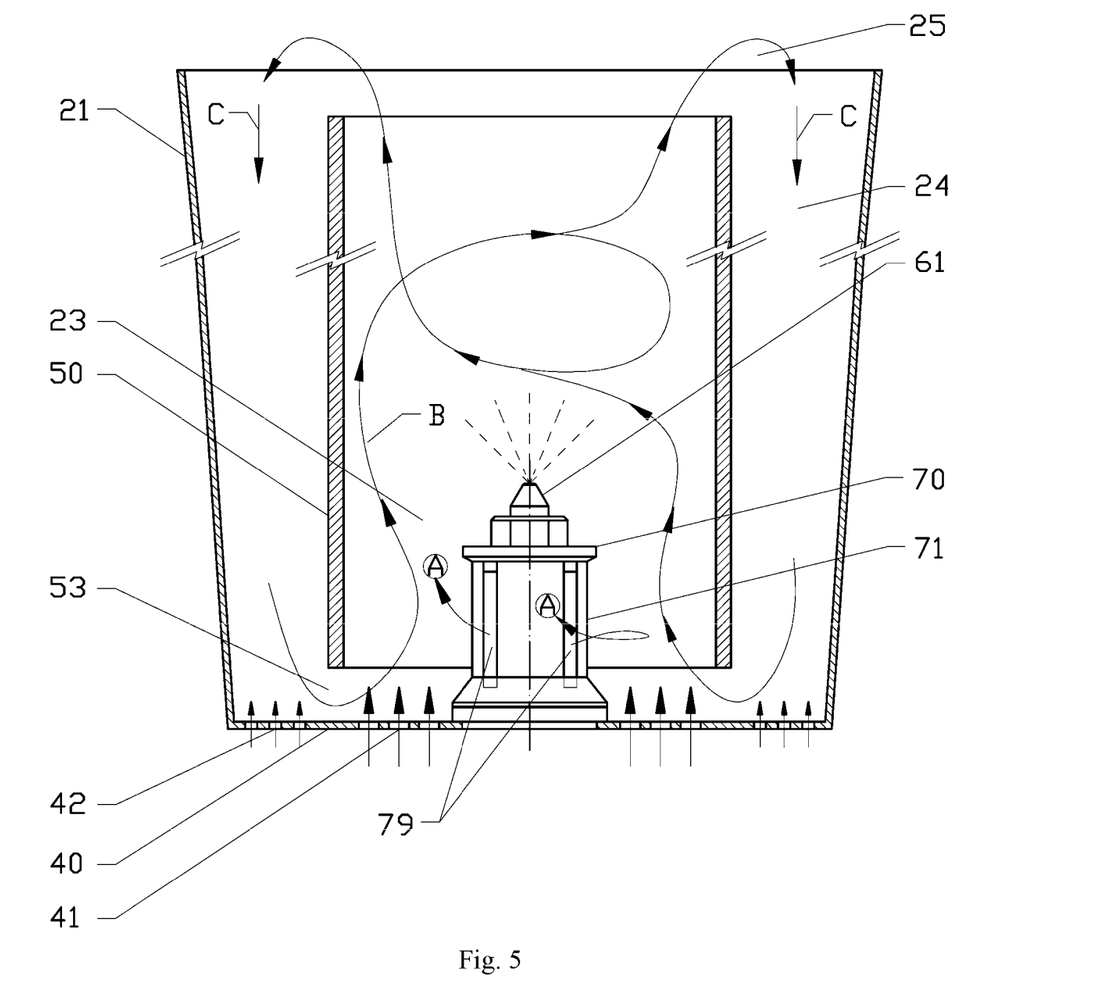

According to the first embodiment of the present invention, a swirl generator 70 is further provided, which can be combined with the sprayer 60 of the above-mentioned conventional fluidized bed apparatus to provide a swirling air stream in the circumferentially outwardly direction relative to the sprayer 60. More particularly, the swirl generator 70 includes a sleeve 71, which can be assembled on the sprayer body 62 and comprises an upper end 77 and a lower end 78, wherein guiding slots 79 extend axially therebetween. And the swirl generator 70 further includes a manifold 81 and a collar 82, which are fixed on the lower end 78, wherein an air pipeline 73 extending from the source of compressed air is connected to the manifold 81 and the collar 82 via a fitting 72. The bottom of the manifold 81 includes a projection 83 adapted to be embedded in a central opening of the air distribution plate 40, wherein the air distribution plate 40 is sandwiched between the manifold 81 and collar 82, while the sleeve 71, the manifold 81 and the collar 82 are screwed or fastened together onto the sprayer body 62 and mounted on the air distribution plate 40 together, wherein a nut 64 for the sprayer 60 is screwed on the sprayer body 62, as best seen in FIG. 2, FIG. 3 and FIG. 5. The sleeve 71 further includes an internal groove 91, into which a sealing member such as an O ring 92 is adapted to be embedded. Similarly, the manifold 81 also includes an internal groove 93, into which a sealing member such as O ring 94 is adapted to be embedded.

The swirl generator 70 is further provided with enlarged apertures 84 and 85, which extend axially throughout the manifold 81 and the collar 82 respectively, the enlarged aperture 84 is adapted to be mounted with the fitting 72, which is connected to a secondary air pipeline 73 and in turn connected to a source of compressed air (not shown). The enlarged aperture 85 is adapted to be mounted with a fitting 65, which is connected to a liquid pipeline 63 and a primary air pipeline 66, and in turn connected to a liquid supply source (not shown) and a compressed air supply source (not shown) respectively. A liquid conduit 67 extends upwardly in the sprayer body 62 to supply liquid from the liquid pipeline 63 for the nozzle 61 so as to discharge a spray, as best seen in FIG. 2 and FIG. 3.

The swirl generator 70 mounted on the sprayer body 62 forms a usually cylindrical-shaped air chamber 74 between the inner wall 76 of the sleeve 71 and the external wall 68 of the sprayer body 62, wherein the air chamber 74 includes an enlarged lower end 75. The O rings 92, 94 seal the upper and the lower ends of the air chamber 74 respectively, as best seen in FIG. 3.

Figure 4:
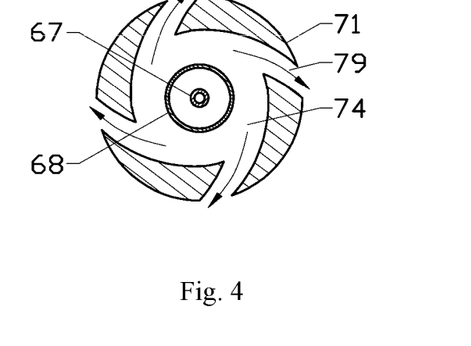

The sleeve 71 of the swirl generator 70 is in the form of a hollow tubular or cylindrical member, its outer periphery is covered with a cylindrical metal mesh 95 thereon to prevent the particles from entering via the guiding slots 79 when the operation of the fluidized bed apparatus 10 is interrupted. The guiding slots 79 extend outwardly as radial tangents in the wall of the tubular sleeve member 71. More particularly, the guiding slots 79 are arranged in rotational symmetry along the circumference of the sleeve 71 and extend outwardly as radial asymptotic tangents in the wall of the sleeve 71. The guiding slots 79 may be directed at an elevation angle relative to the horizontal plane, such as 5° to 80° or more preferably of 15° to 60° relative to the horizontal plane, as best seen in FIG. 3 and FIG. 4. When the air from the air chamber 74 enters into the upward flow bed area 23 via the slots 79, such feature of the guiding slots 79 enables swirling motion of the air. It is important that the slots 79 extend outwardly in the same tangential direction in the wall of the tubular sleeve 71, which means all the slots 79 would provide an air stream in the same clockwise or counter-clockwise direction near the sprayer 60, thereby the effect of the swirling motion of the air stream is improved.

FIG. 5 shows the convection path of the product in the fluidized bed apparatus 10 using the swirl generator 70 according to the present invention. The pressurized air conventionally supplied from the primary air source via the primary air duct 31 passes through the openings 41 and 42 of the air distribution plate 40 respectively so as to form a rising air stream, while the compressed air supplied from the secondary air source flows into the air chamber 74 via the secondary air pipeline 73 and the fitting 72, wherein the air stream is discharged through the slots 79 so as to generate a swirling air stream in a rotational outward direction relative to the sprayer 60, as represented by arrow A in FIG. 5. A rotational rising air stream is generated in the upward flow bed area 23 under combined effect of the stronger upward air stream and the swirling air stream. The rotational rising air stream in high velocity allows a sufficient development of the particle flow pattern and carries the particles into a rotational rising path, simultaneously the particles are subjected to spinning movement (not shown) due to slight friction between the particles and the inner wall of the partition 50, which increases opportunities for the particles to obtain a more uniform spray when subsequently passing through the spray zone above the nozzle 61, as represented by arrow B in FIG. 5. The volume of the rotational rising air stream allows the spray pattern to develop sufficiently before contacting with the rotational rising particles. When the particles wetted by the spray zone travel into the expansion area 25 above the partition 50, the particles encounter a weaker upward air stream in low velocity here, which causes the particles to fall downwardly in the downward flow bed area 24, as represented by arrow C in FIG. 5. In the downward path, the particles are dried to such an extent that the weaker upward air stream through the surrounding area of the air distribution plate 40 is sufficient to avoid any agglomeration in the fluidized layer. Due to the suction generated by the rotational rising air stream on the annular slit 53, the particles are then sucked into the upward flow bed area 23 through the annular slit 53. In such a way, the spraying for the particles in the upward flow bed area 23 and the drying thereof in the downward flow bed area 24 form a circulation. The swirl generator 70 provides hereby an aerodynamic means of the rotational rising air stream, which contributes to the sufficient development of the spray pattern and the particle flow pattern as well as to optimize the convection path of the product so as to obtain a uniform spray for the particles.

Second Embodiment

Figure 8:
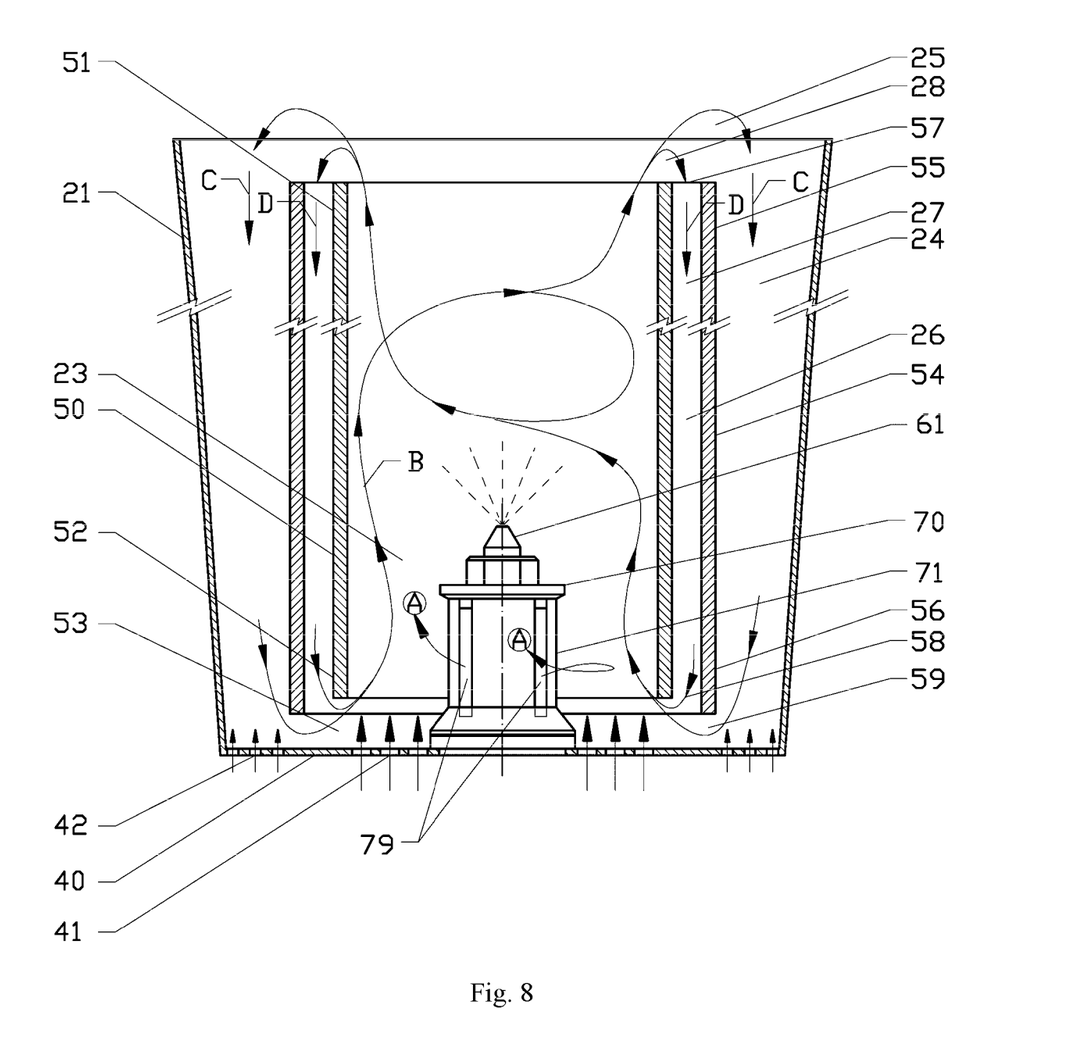

With reference to FIG. 8, the second embodiment of the present invention is an improved solution based on the first embodiment of the present invention, wherein a secondary partition 54 is provided besides the partition 50 so as to provide a downward descending air stream between the partition 50 and the secondary partition 54. The usually cylindrical-shaped secondary partition 54 is larger in diameter than the partition 50 and is positioned coaxially with the partition 50 so as to form an annular air passage 26 between the partition 50 and the secondary partition 54. The cylindrical partition 50, for example in form of cylinder, and secondary partition 54 are mounted in the center of the container 20 and together separate the container 20 into a central upward flow bed area 23, a surrounding downward flow bed area 24 and a descending flow bed area 27 sandwiched between the partition 50 and the secondary partition 54. The secondary partition 54 comprises an open upper end 55 and an open lower end 56. More preferably, the upper end 55 and the upper end 51 of the partition 50 are at the same horizontal level and together form an annular gap 57, while the lower end 56 is lower than the lower end 52 of the partition 50 in the vertical height, so that a preset height difference exists therebetween, wherein the lower end 56 forms another annular gap 58 together with the lower end 52 of the partition 50 and forms a secondary annular slit 59 with the air distribution plate 40. The air distribution plate 40 in the annular vertical projection area between the partition 50 and the secondary partition 54 is not provided with openings.

FIG. 8 shows the convection path of the product in the fluidized bed apparatus 10 using the secondary partition 54 according to the second embodiment of the present invention in combination with the partition 50 and the swirl generator 70. The similarities between the second embodiment of the present invention shown in FIG. 8 and the first embodiment of the present invention shown in FIG. 5 lie in that, the pressurized air conventionally supplied from the primary air source via the primary air duct 31 passes through the openings 41 and 42 of the air distribution plate 40 respectively and are discharged so as to form a rising air stream, while the compressed air supplied from the secondary air source flows into the air chamber 74 via the secondary air pipeline 73 and the fitting 72, wherein the air stream is discharged through the guiding slots 79 so as to generate a swirling air stream in a rotational outward direction relative to the sprayer 60, as represented by arrow A in FIG. 8. A rotational rising air stream is generated in the upward flow bed area 23 under combined effect of the stronger upward air stream and the swirling air stream. The rotational rising air stream in high velocity allows a sufficient development of the particle flow pattern and carries the particles into a rotational rising path, simultaneously the particles are subjected to spinning movement (not shown) due to slight friction between the particles and the inner wall of the partition 50, which increases opportunities for the particles to obtain a more uniform spray when subsequently passing through the spray zone above the nozzle 61, as represented by arrow B in FIG. 8, the volume of the rotational rising air stream allows the spray pattern to develop sufficiently before contacting with the rotational rising particles. The differences between the second embodiment of the present invention shown in FIG. 8 and the first embodiment of the present invention shown in FIG. 5 lie in that, the lower end 56 of the secondary partition 54 additionally provided is lower in the vertical height than the lower end 52 of the partition 50 and therefore a preset height difference exists therebetween, such that the rotational rising air stream causes suction on the annular gap 58 between the lower end 56 of the secondary partition 54 and the lower end 52 of the partition 50, and consequentially a descending air stream is generated in the descending flow bed area 27 in the annular air passage 26 between the partition 50 and the secondary partition 54. When the particles wetted by the spray zone travel into the descending area 28 above the annular gap 57 between the partition 50 and the secondary partition 54, the smaller particles fall into the annular gap 57 along with the descending air stream due to less momentum, as represented by arrow D in FIG. 8, while the larger particles continue to fly into the expansion area 25 above the partition 50 due to higher momentum, wherein the larger particles encounter weaker upward air stream in low velocity, which allows the larger particles to fall downwardly in a downward flow bed area 24, as represented by arrow C in FIG. 8. The smaller particles fall down and are dried in the descending flow bed area 27 in the annular air passage 26 between the partition 50 and the secondary partition 54. Due to larger specific surface area and being in the flowing air stream in high velocity, the smaller particles are dried in the descending path to be sufficient to avoid any adhesion. The larger particles are dried in the downward path to such an extent that the weaker upward air stream through the surrounding area of the air distribution plate 40 is sufficient to avoid agglomeration in the fluidized layer. Due to the suction generated by the rotational rising air stream on the annular slit 53 and subsequently on the annular gap 58, the smaller particles are then sucked into the upward flow bed area 23 through the annular gap 58 and subsequently through the annular slit 53. Due to the suction generated by the rotational rising air stream on the annular slit 53 and subsequently on the secondary annular slit 59, the larger particles are then sucked into the upward flow bed area 23 through the secondary annular slit 59 and subsequently through the annular slit 53. In such a way, the spraying for the smaller particles in the upward flow bed area 23 and the drying thereof in the descending flow bed area 27 form a circulation, while the spraying for the larger particles in the upward flow bed area 23 and the drying thereof in the downward flow bed area 24 also form a circulation. Since the upward air stream discharged through the air distribution plate 40 does not pass through the descending flow bed area 27, the smaller particles are in a shorter circulation path relative to the circulation path of the larger particles and obtain more opportunities to be sprayed. Thereby, the combination of the partition 50 with the secondary partition 54 provides an aerodynamic means of the descending air stream in the descending flow bed area 27 in the annular air passage 26 between the partition 50 and the secondary partition 54, which allows the sprayed particles to be differentiated according to the particle size and distinctively treats the particles having different particle sizes caused by different effects of the spraying respectively.

It should be concerned that, in the convection path of the product shown in FIG. 8 according to the second embodiment of the present invention, the particles enter into the rotational rising air stream and are accelerated continuously in the rotational rising direction in the preset vertical section of the partition 50, which causes all of the particles wetted by the spray zone to fly away the upper end 51 of the partition 50 at an approximate same tangential velocity. Mass of the particles and consequentially flying momentum thereof depend on the particle size of the particles, and the radial flying distance and the radial falling section of the particles depend on the flying momentum of the particles under the action of the descending air stream in the descending area 28, so that the descending air stream in the descending area 28 has sorting effect on particles of different particle sizes. By adjusting the volumes and the pressures of the stronger upward air stream and swirling air stream, the velocity of the rotational rising stream can be changed and therefore the tangential velocity of the particles when flying away from the upper end 51 of the partition 50 is changed, so as to selectively adjust the range of the particle size of the particles falling into the descending flow bed area 27, thus the optimization ability of the fluidized bed apparatus 10 in accordance with the process requirements is improved.

The significances of the second embodiment of the present invention in practical applications should be also noted, in one aspect, the smaller particles are prevented from falling into the fluidized layer in the process of coating or granulating due to their high surface energy, which avoids adhesions formed with the larger particles due to high surface energy of the smaller particles, while the smaller particles are prevented from adhering mutually as being in the high-speed flowing air stream, which eliminate or minimize agglomerations of the product. In another aspect, the smaller particles are treated selectively in a continuous circulation and the difference in particle sizes relative to the larger particles are minimized till all the particles of the product are uniform in particle size, which improve the quality of the product, especially for the granulating process. In a further aspect, the adverse effect of non-uniform spraying for the particles due to the mutual obscuring effect while passing through the spray zone are eliminated or minimized and are selectively circulated through the descending flow bed area 27, the adverse effect of non-uniform spraying for the particles due to the mutual obscuring effect is eliminated or minimized, such that the quality of the spraying on the particles is improved, especially for the particles to be coated, on which a more uniform coating film can be formed. In another further aspect, due to the above-mentioned advantages, the fluidized bed apparatus 10 according to the second embodiment of the present invention is improved in the adaption capability and the optimization ability in accordance with the process requirements for the particles with high surface energy, and the utilization scope of the process of coating and granulating is expanded.

It is obvious that the advantages of the swirl generator 70 of the present invention relative to the air flow diverters and the air vortex generators of the prior arts are fully demonstrated by the description of the first and second embodiments of the present invention. In one aspect, the swirl generator 70 of the present invention is mounted in the partition 50 coaxially, wherein the swirling air stream provided by the swirl generator 70 is limited in the partition 50 and is prevented from interfering with the air stream and the convection path of the product outside the partition/partitions. In another aspect, the swirl generator 70 of the present invention provides the swirling air stream in the preset vertical section of the partition 50, so that the rotational rising air stream generated under combined effect of the stronger upward air stream and the swirling air stream possesses stable aerodynamic characteristics, which contributes to the development of the spray pattern and the particle flow pattern and therefore to be stably conducive to the atomization of the droplets and acceleration of the particles. In a further aspect, the swirling air stream provided by the swirl generator 70 of the present invention can be adjusted by changing its volume and pressure, thus the aerodynamic characteristic of the rotational rising air stream can be precisely controlled, which improve the adaption capability and the optimization ability of the fluidized bed apparatus 10 of the present invention. In another further aspect, the swirl generator 70 of the present invention can be easily and simply appended to a conventional fluidized bed apparatus so as to obtain promotion and improved performance, which saves lots of social resources and improve the value of applying and popularizing the present invention.

The volume and pressure of the air stream discharged from the swirl generator 70 can be easily controlled and monitored using valves and gauges (not shown).

Although only one single circulation of the process is depicted here in the first embodiment of the present invention, the particles can be circulated between the upward flow bed area 23 and the downward flow bed area 24 multiple times, until the desired treatment has been achieved, after which the treated product is removed from the container 20. Similarly, although only one single circulation of process is depicted here in the second embodiment of the present invention, the particles can be sorted according to their particle size after being sprayed and the particles in different particle sizes are treated differentially, wherein the smaller particles can be circulated between the upward flow bed area 23 and the descending flow bed area 27 multiple times, until the desired treatment has been achieved, while the larger particles can be circulated between the upward flow bed area 23 and the downward flow bed area 24 multiple times, until the desired treatment has been achieved, after which the treated product is removed from the container 20.

Accordingly, the fluidized bed apparatus 10 and method according to the present invention enable the spray pattern from the nozzle 61 and the particle flow pattern in the partition 50 to develop more sufficiently, so that the spray solution from the nozzle 61 can be atomized more sufficiently and the particles can be sprayed more uniformly when passing through the spray zone, which eliminates or minimizes agglomerations in the product. The improved fluidized bed apparatus 10 and method according to the present invention also sorts the particles after being sprayed according to their particle sizes and treats the particles 
differentially, thus the quality of the product and the performance of the fluidized bed apparatus 10 are improved.

Due to the advantages of the fluidized bed apparatus 10 according to the present invention, the fluidized bed apparatus 10 can be fully employed in existing processes, such as coating, granulating and drying. Furthermore, the method according to the present invention can be fully applied to all materials, such as fine powder, particulate materials, granules, beads, pellets, pills, capsules and mini-tablets.

Furthermore, the method according to the present invention can be performed as a step in a combined process, preferably using the apparatus 10 according to the present invention.

The embodiments described above may have various modifications. For example, a sprayer 60 and the swirl generator 70 according to the present invention may be utilized in systems other than the fluidized bed apparatus 10 where aerodynamic means is desirable, wherein such system may not require the sprayer 60 to be disposed upright, while the sprayer 60 may be angled with respect to the major axis of the container 20. The sprayer 60 and the swirl generator 70 according to the present invention may also be utilized without a partition 50. Moreover, alternatively, a swirl generator 70 may be integrated with the sprayer 60 to prevent the particles from interfering with the spray pattern and the particle flow pattern.

The swirl generator 70 according to the present invention comprises a plurality of guiding slots 79 extending axially. Although the embodiments of the present invention describe four guiding slots 79 along with its constructive configuration, it is understood that more or less number of the guiding slots 79 can be utilized to accomplish the objects of the present invention. On the premise of the aerodynamic characteristics of the swirl generator 70 of the present invention, each guiding slots 79 can be assembled by a plurality of axially arraying circular holes or air jet nozzles that extend radially in the same or similar constructive configuration in the inner wall of the sleeve 71 of the swirl generator 70, wherein the air stream is discharged through the circular holes or the air jet nozzles so as to generate a swirling air stream rotating outwardly relative to the sprayer 60.

Corresponding to each sprayer 60, the number of the partition/partitions according to the present invention may be one separately applied partition 50 or a combination of the partition 50 and the partition 54, even a combination of more partitions. On the premise of the aerodynamic characteristics of the partition/partitions of the present invention, the shape of each partition of the present invention may be a rotational-symmetrical cylinder or an approximate cylinder, for example in a rotational-symmetrical Venturi-like form or a partial Venturi-like form. A plurality of partitions utilized as a combination may be in the same or similar shape, or in different shapes. Although it is depicted in the second embodiment of the present invention that the upper ends of two partitions utilized as a combination are at the same horizontal level, on the premise of the aerodynamic characteristics of the partitions of the present invention, there may exist a preset height difference between the upper ends of the two or more partitions utilized as a combination. Moreover, the annular slits between the partitions and the air distribution plate 40 can be adjustable to adapt to the batch growth of the product and the variations of the convection path of the product throughout the process.

The air distribution plate 40 is depicted in the embodiments of the present invention, wherein the generating of the upward air stream and its entering into the fluidized bed apparatus 10 may be achieved through other structure or by other distribution means. Although for the sake to be understood easily, it is depicted that the openings 41 in the air distribution plate are larger in diameter and the openings 42 in the air distribution plate 40 are smaller in diameter in the embodiments of the present invention, the diameter of the openings 41 is not necessarily larger than the diameter of the opening 42, since the axial velocity and the tangential velocity of the swirling air stream can be changed by adjusting the volume and pressure of the swirl generator 70, thus the function of the upward air stream may be partially compensated or completely substituted by increasing the volume and the axial velocity of the swirling air stream. Moreover, the air distribution plate 40 of the present invention may be optionally a horizontal circular plate, or in form of a conical shape or other shapes slanting towards the central area in the partition 50, so as to facilitate movement of the particles being in the fluidized layer above the distribution plate 40 outside the partition 50 toward the central area inside the partition 50.

Figure 6:
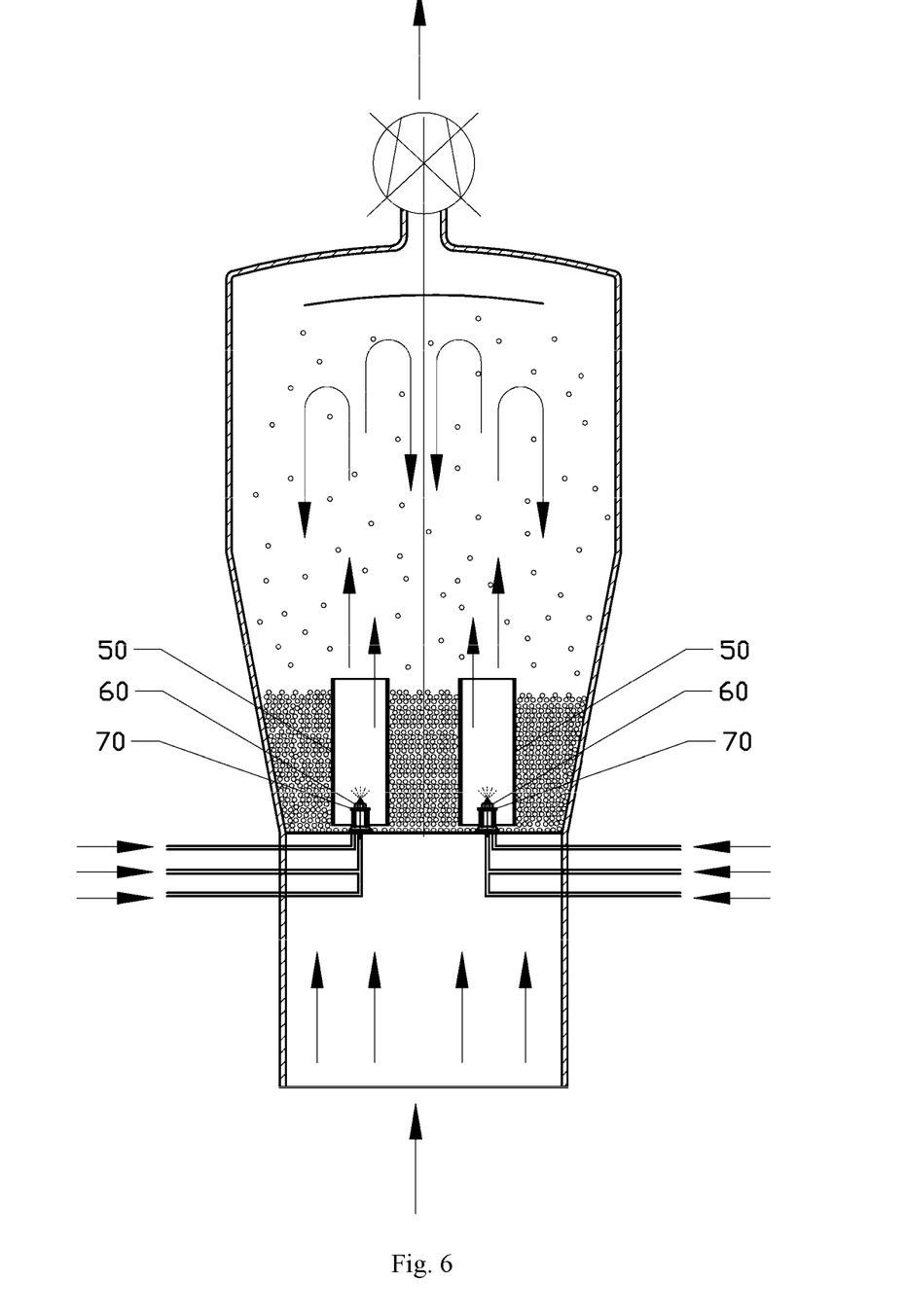
Figure 7:
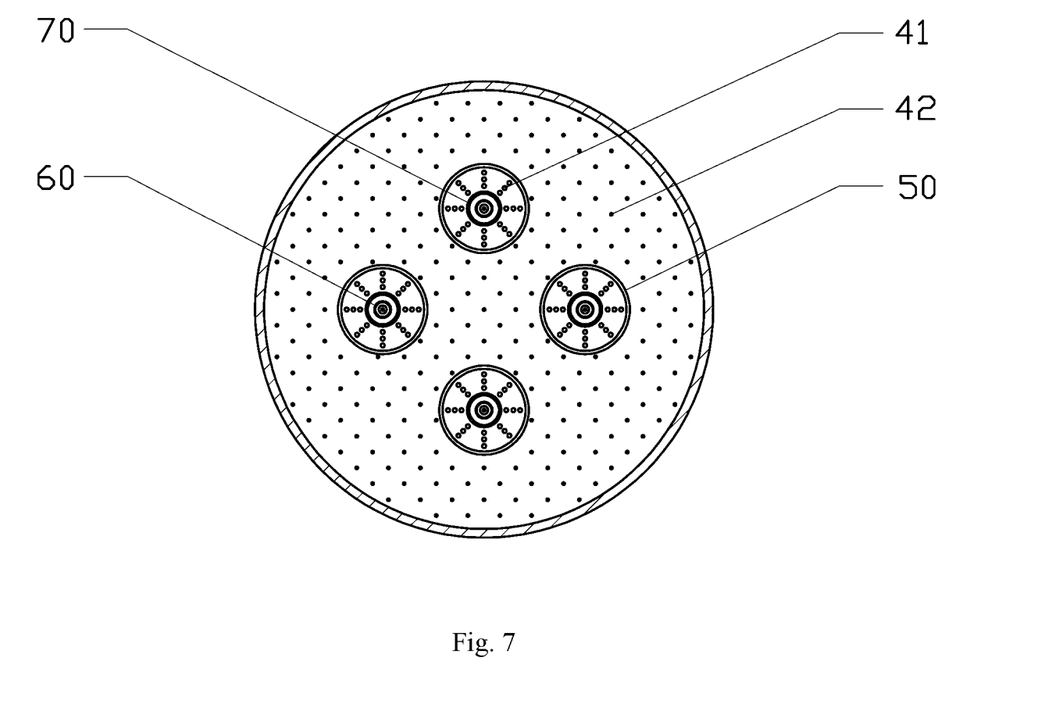

In the first embodiment comprising several processing modules as shown in FIG. 6 and FIG. 7, said modules are placed on a generally circular air distribution plate 40 in the same or similar configuration and construction. The particles circulate in substantially identical form in each processing module, so that the particles spend substantially the same time when passing through the spray cloud and obtain a uniform processing of high quality, which increases the spray rate and expedites the operation, thus, the risk of adhesions of the particles and clogging of the nozzle 61 is eliminated or reduced, also the risk of varying flow resistance caused by agglomerations of the particles are removed. Furthermore, the attrition of the particles is minimized due to the fact that the particle flow pattern of the particles in the partition 50 travels spirally upward. Similarly, the second embodiment may also comprise several processing modules (not shown), and said modules are placed on a generally circular air distribution plate 40 in the same or similar configuration and construction. The particles circulate respectively in substantial identical patterns in each processing modules so as to sort the sprayed particles by their particle sizes and differentially treat the particles having different particle sizes, thus the smaller particles are prevented from adhering in the process of coating or granulating. The smaller particles are treated selectively in the continuous circulation till all the particles of the product are uniform in particle size, and simultaneously the adverse effect of non-uniform spraying on the particles due to the mutual obscuring effect is eliminated or minimized. Thus, the fluidized bed apparatus 10 of the present invention is improved in the adaption capability to the process requirements of the particles with high surface energy, and the application scope of the process of coating and granulating is expanded.

Whereas the present invention has been shown and described in connection with the preferred embodiments thereof, it is obvious that any modifications, substitutions, and additions may be made within the intended broad scope as claimed in the claims.

What is claimed is:

1. A swirl generator of a fluidized bed apparatus for particle-coating or granulating, wherein the fluidized bed apparatus comprises a product container, a lower plenum base, an air distribution plate residing between said product container and said plenum base, and a partition, said fluidized bed apparatus further comprises at least one sprayer which includes a sprayer body and a nozzle provided at an upper end of the at least one sprayer, a lower end of said at least one sprayer extends throughout said air distribution plate, said partition is vertically positioned coaxially with said at least one sprayer in said product container and is suspended above said air distribution plate, the swirl generator is mounted on said sprayer body characterized in that, said swirl generator extends through said air distribution plate and is connected to a source of compressed air, and said swirl generator comprises a tubular sleeve extending circumferentially around said sprayer body, an air chamber is defined between said sleeve and said sprayer body, and said sleeve comprises a plurality of guiding slots, the air from said source of compressed air via said air chamber is directed by said guiding slots to rotate outwardly, so as to provide a swirling air stream circumferentially outwardly relative to said at least one sprayer.

2. The swirl generator according to claim 1, characterized in that said guiding slots extend outwardly as radial tangents in the wall of said sleeve.

3. The swirl generator according to claim 2, characterized in that said guiding slots extend outwardly as radial asymptotic tangents in the wall of said sleeve.

4. The swirl generator according to claim 2, characterized in that said guiding slots extend outwardly and upwardly as radial tangents in the wall of said sleeve, through which the air stream is directed to rotate outwardly and upwardly.

5. The swirl generator according to claim 1, characterized in that said guiding slots are directed at an elevation angle between 5° to 80° relative to the horizontal plane.

6. The swirl generator according to claim 5, characterized in that said guiding slots are directed at an elevation angle between 15° to 60° relative to the horizontal plane.

7. The swirl generator according to claim 1, characterized in that said swirling air stream is provided in a preset vertical section in said partition.

8. The swirl generator according to claim 1, characterized in that said sleeve includes an upper end and a lower end, said guiding slots extend axially between said upper end and said lower end.

9. The swirl generator according to claim 8, characterized in that the lower end of said sleeve is attached with a manifold, an air pipeline extending from said source of compressed air is connected to said manifold, and said sleeve further includes a collar, and said air distribution plate is sandwiched between said manifold and said collar.

10. The swirl generator according to claim 8, characterized in that an enlarged aperture extends axially through a manifold and a collar, the enlarged aperture is adapted to be mounted with a fitting connected to the air pipeline, which is subsequently connected to said source of compressed air.

11. The swirl generator according to claim 8, characterized in that a cylindrical metal mesh is covered between the upper end and the lower end of said sleeve, so as to prevent the particles from entering via said guiding slots when operation of the fluidized bed apparatus is interrupted.

12. The swirl generator according to claim 1, characterized in that said partition is cylindrical or approximate cylindrical.

13. A fluidized bed apparatus for particle-coating or granulating comprising:
a product container comprising an expansion chamber for containing the particles;
a plenum base disposed beneath said product container and including an inlet duct extending from a primary air source;
an air distribution plate positioned at the bottom of said expansion chamber, wherein said air distribution plate comprises a plurality of air passage openings, through which an air stream from said plenum base enters into said product container;
at least one sprayer positioned vertically above said air distribution plate for upwards discharging a spray of solution into said expansion chamber for particle-coating or granulating;
at least one partition positioned coaxially with said at least one sprayer in said product container vertically and suspended above said air distribution plate;
characterized in that, the openings of said air distribution plate inside a vertical projection area of said partition are larger in diameter than the openings outside the vertical projection area of said partition, so that a stronger upward air stream in larger air volume and higher velocity is generated in an area of said openings of said air distribution plate inside the vertical projection area of said partition and a weaker upward air stream in smaller air volume and lower velocity is generated in an area of said openings outside the vertical projection area of said partition, thereby for the particles, an upward flow bed area and a downward flow bed area separated by said partition are aerodynamically formed in said product container; and
wherein said at least one sprayer is combined with said swirl generator according claim 1, and a swirling air stream circumferentially outwardly relative to said at least one sprayer is generated by said swirl generator through the air chamber and the plurality of guiding slots, wherein a rotational rising air stream is generated in said partition under combined effect of said swirling air stream and said stronger upward air stream provided through said openings in larger dimension, such that said particles travel in a circulation path that rotationally rises in said upward flow bed area and falls downwardly in said downward flow bed area.

14. The fluidized bed apparatus according to claim 13, characterized in that said partition comprises an open upper end and an open lower end, said upper end of said partition extends upwardly into an expansion area defined between said upward flow bed area and said downward flow bed area, the lower end of said partition is suspended above said air distribution plate and forms an annular slit with said air distribution plate.

15. The fluidized bed apparatus according to claim 13, characterized in that the rotational rising air stream is generated in a preset vertical section of said partition.

16. The fluidized bed apparatus according to claim 13, characterized in that at least one secondary partition is further equipped, said secondary partition is larger than said partition in diameter and is positioned coaxially with said partition so as to form an approximate annular air passage between said partition and said secondary partition.

17. The fluidized bed apparatus according to claim 16, characterized in that said air distribution plate in an annular vertical projection area between said partition and said secondary partition is not provided with openings.

18. The fluidized bed apparatus according to claim 16, characterized in that said secondary partition comprises an open upper end and an open lower end.

19. The fluidized bed apparatus according to claim 18, characterized in that the upper end of said secondary partition and the upper end of the partition are at the same horizontal level and form an annular gap together.

20. The fluidized bed apparatus according to claim 18, characterized in that the lower end of said secondary partition and the lower end of the partition form another annular 
gap together, while the lower end of said secondary partition and said air distribution plate form a secondary annular slit.

21. The fluidized bed apparatus according to claim 16, characterized in that a descending flow bed area is formed between said partition and said secondary partition, wherein the particles in smaller particle size travel in a circulation path that rotationally rises in said upward flow bed area and falls downwardly in said descending flow bed area due to less momentum.

22. The fluidized bed apparatus according to claim 16, characterized in that said secondary partition is cylindrical or approximate cylindrical.

23. A method used in said fluidized bed apparatus for particle-coating or granulating according to claim 13, the method comprising:
  for the particles, directing said stronger upward air stream to aerodynamically form an upward flow bed area and a downward flow bed area separated by the partition in said product container of said fluidized bed apparatus, wherein said stronger upward air stream carries said particles upwardly through the upward flow bed area, where the particles are coated or granulated by at least one sprayer for discharging a spray of solution into said expansion chamber; and aerodynamically directing a swirling air stream to cause said particles to rotate circumferentially outwardly relative to said at least one sprayer;

wherein a rotational rising air stream is generated in said partition under combined effect of said stronger upward air stream and said swirling air stream, such that said particles travel in a circulation path that rotationally rises in said upward flow bed area and falls downwardly in said downward flow bed area and/or said descending flow bed area.

24. The method according to claim 23, characterized in that said method further comprises generating said swirling air stream through a sleeve of said swirl generator surrounding the sprayer body of said at least one sprayer.

25. The method according to claim 24, characterized in that said method further comprises discharging the swirling air stream through said sleeve to rotate outwardly and upwardly.

26. The method according to claim 23, characterized in that said particles are directed to rotate outwardly away from said at least one sprayer before entering into the spray zone.

27. The method according to claim 26, characterized in that said particles are directed to rotate outwardly away from said at least one sprayer by the swirling air stream rotating outwardly near said at least one sprayer.

28. The method according to claim 23, characterized in that a rotational rising air stream is generated in a preset vertical section of said partition so as to cause said particles in said preset vertical section to accelerate in a rotational and rising direction.

29. The method according to claim 23, characterized in that said stronger upward air stream and said swirling air stream are controlled separately, so as to change the axial velocity and the tangential velocity of said rotational rising air stream respectively.

30. The method according to claim 23, characterized in that said particles are subjected to spinning movement due to slight friction with the inner wall of said partition.

* * * * *